July 14, 1925.

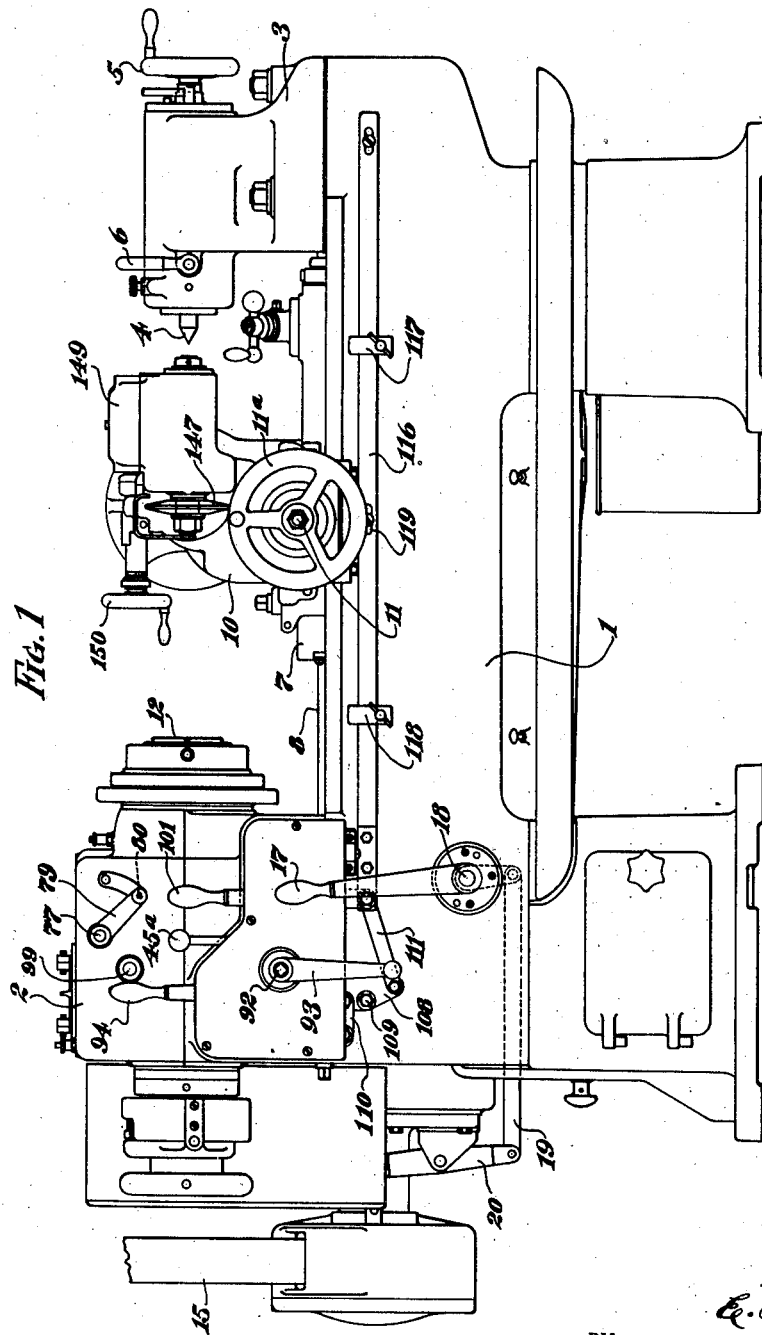

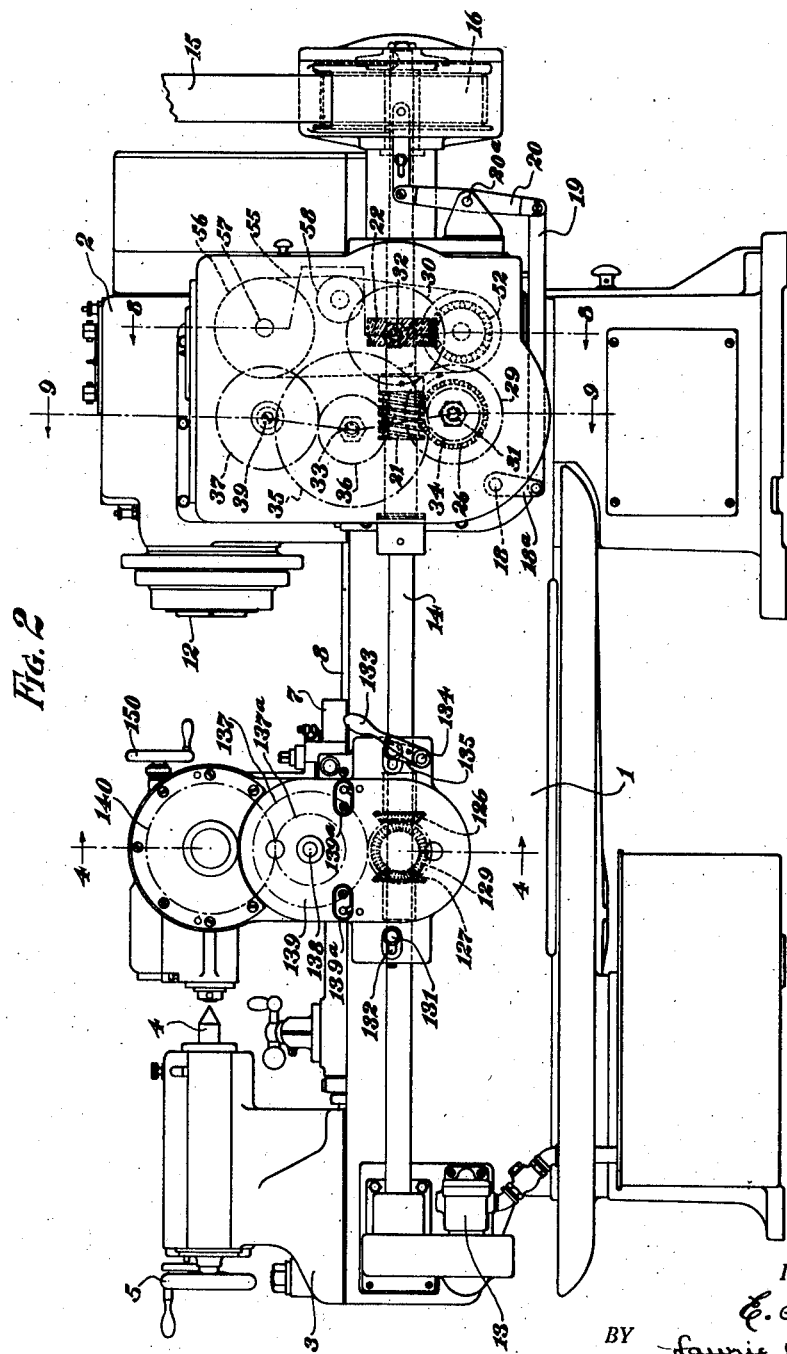

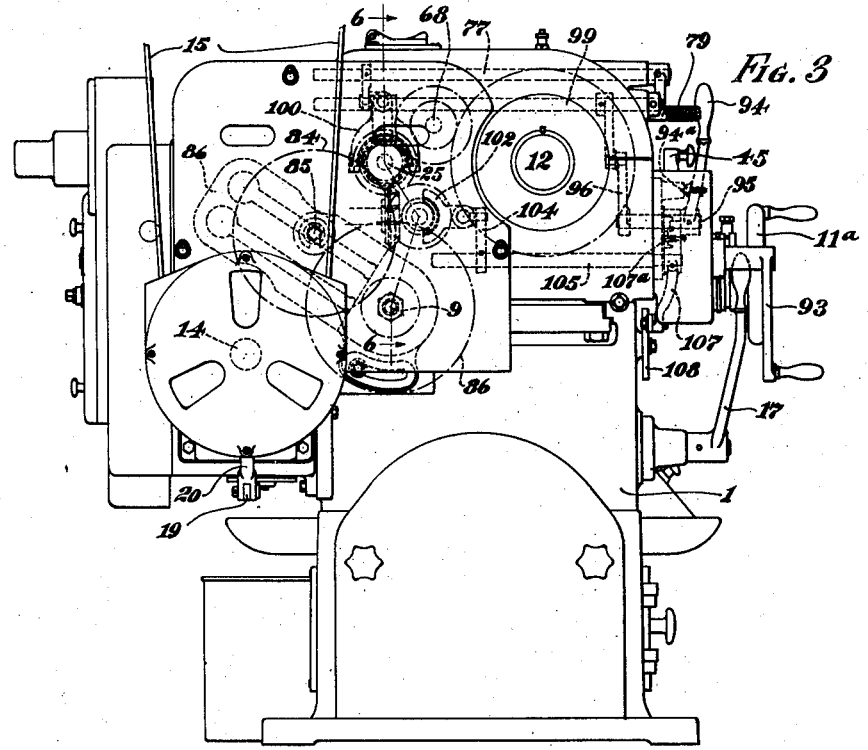
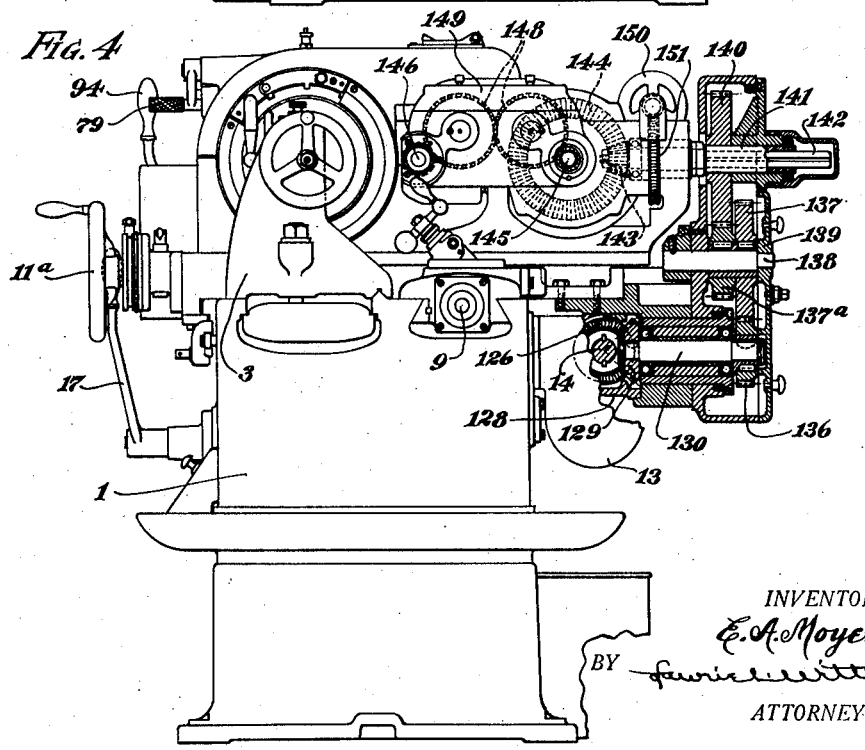

E. A. MOYER 1,545,681

THREAD MILLING MACHINE

Filed Aug. 21, 1922

INVENTOR,
E. A. Moyer,
BY
ATTORNEY

July 14, 1925.

E. A. MOYER

THREAD MILLING MACHINE

Filed Aug. 21, 1922

INVENTOR,
E. A. Moyer,
BY
ATTORNEY

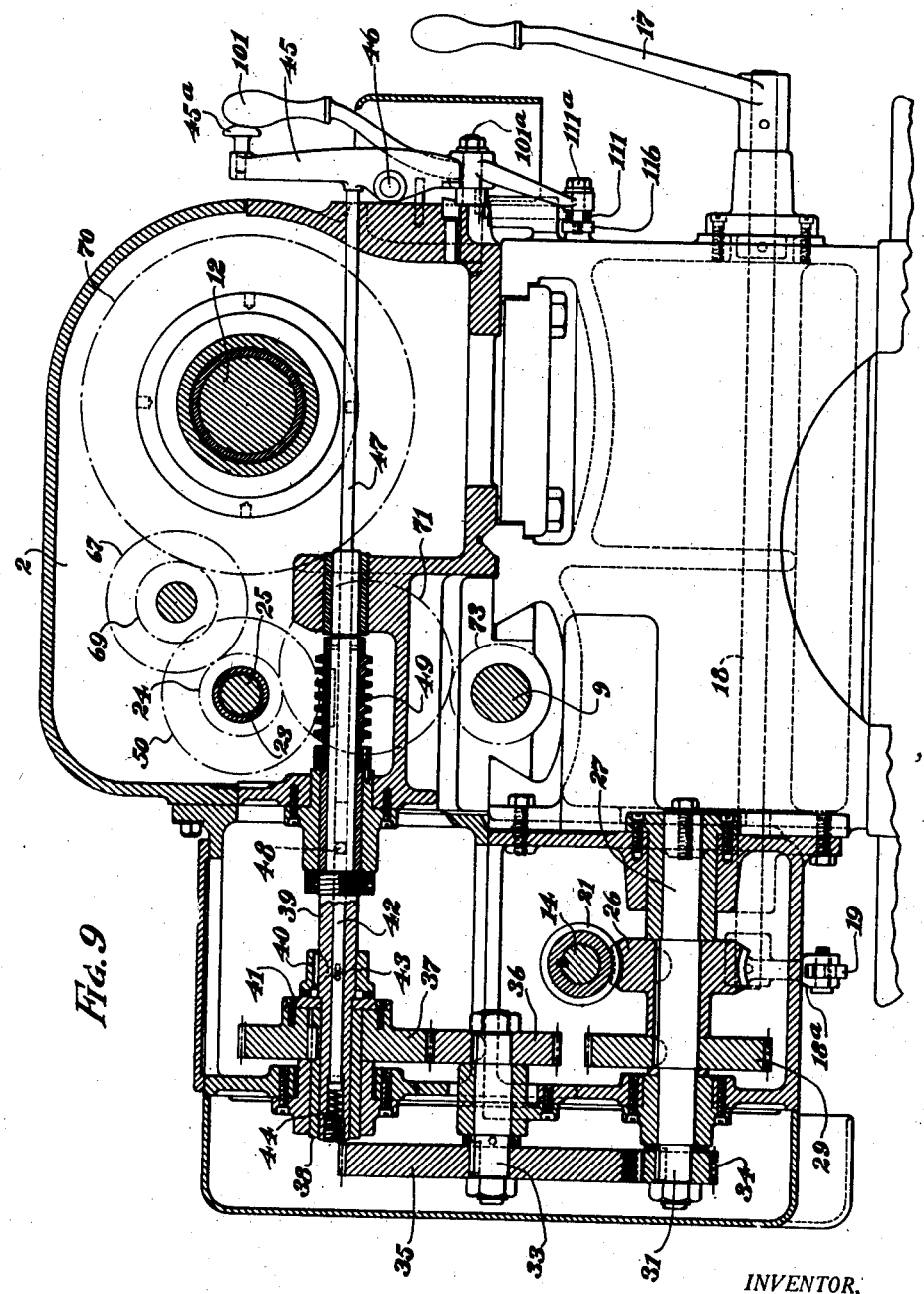

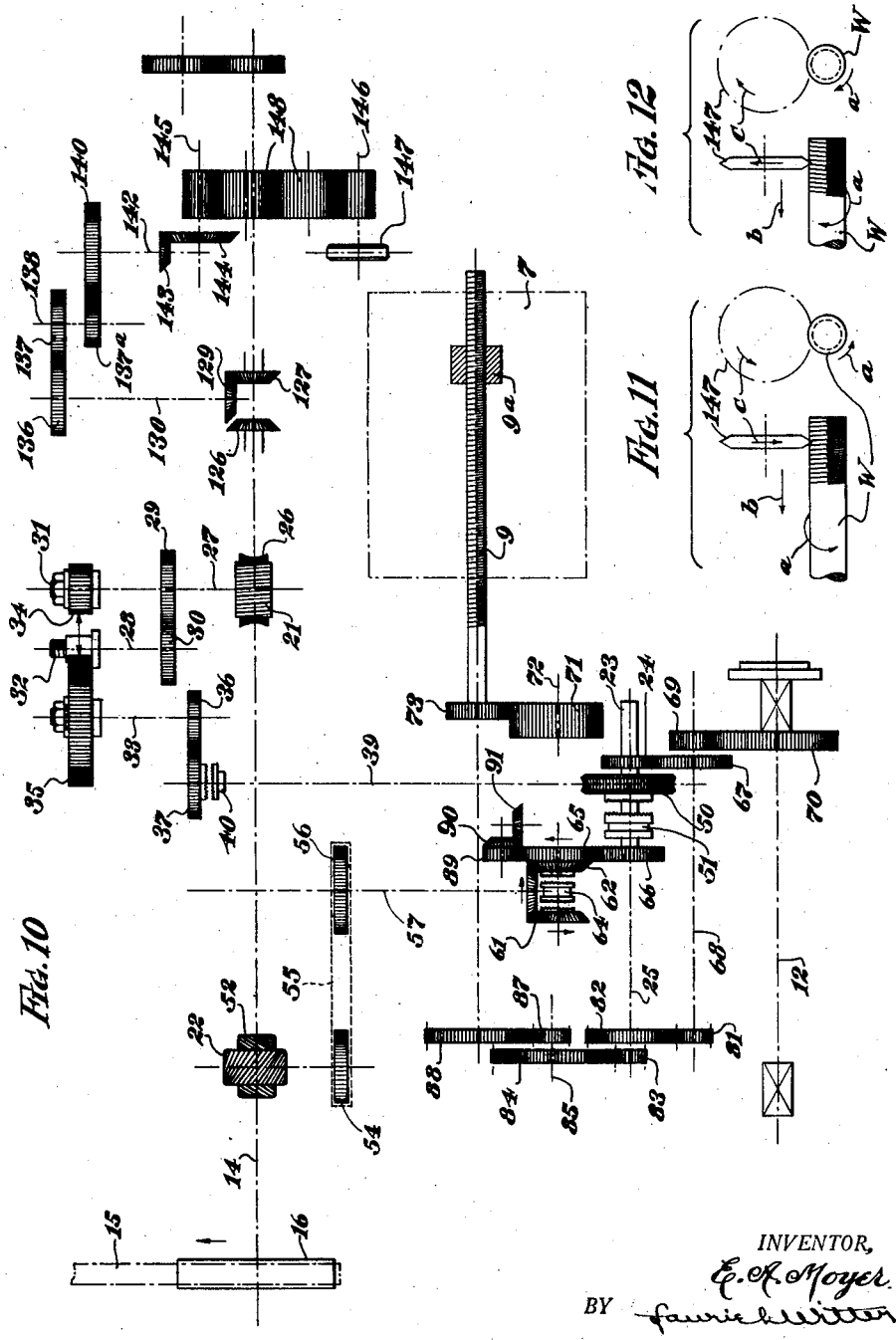

Patented July 14, 1925.

1,545,681

UNITED STATES PATENT OFFICE.

EDWARD A. MOYER, OF WEST HARTFORD, CONNECTICUT, ASSIGNOR TO PRATT & WHITNEY COMPANY, OF NEW YORK, N. Y., A CORPORATION OF NEW JERSEY.

THREAD-MILLING MACHINE.

Application filed August 21, 1922. Serial No. 583,397.

*To all whom it may concern:*

Be it known that I, EDWARD A. MOYER, a citizen of the United States, residing at West Hartford, in the county of Hartford and State of Connecticut, have invented certain new and useful Improvements in Thread-Milling Machines, of which the following is a specification.

This invention relates to metal working machines and particularly to a thread milling machine of the type combining a rotary work spindle with a movable tool carriage mounting a tool spindle adapted to support a milling cutter for operating on the work carried by the work spindle. The primary object of the invention is to provide an improved thread milling machine of such type.

In a thread milling machine of the type above stated, the tool carriage is adapted to be moved along the work, ordinarily by means of a lead screw, synchronously with the rotation of the work spindle whereby a thread of the desired lead is cut in the work. When cutting a fine thread the spindle necessarily rotates much faster than the lead screw, while in forming a thread of coarse pitch the lead screw must rotate more rapidly than the spindle. The usual practice in thread milling machines is to drive the lead screw from the work spindle, change gears being interposed to give the desired feed. This practice is very satisfactory when cutting a fine thread since the change gears from the spindle to the lead screw effect a reduction of speed to the latter. However, when cutting a thread or spiral of coarse pitch by this arrangement, the strain on the spindle and the mechanism connecting it with the lead screw is severe since the change gears from the spindle to the lead screw effect an increase of speed to the latter. This method of operation in such cases is entirely unsatisfactory and it is often impossible to form threads of very great pitch by this method. The machine comprising the present invention avoids such objection by providing a construction wherein either the work spindle may be driven directly and the screw driven indirectly therefrom or the screw may be driven directly and the work spindle driven indirectly therefrom. In such construction when cutting a thread of coarse pitch as last described, the screw will be driven directly and the work spindle driven indirectly therefrom at a reduced speed through the change gears, thus avoiding the strain incident to operating the element driven by the change gears at a higher speed than the driving element therefor.

It should be stated that the method of thread milling just described in the preceding paragraph is not broadly new, the same being shown and described in Patent Nos. 782,237 and 948,696 to B. M. W. Hanson. The present invention has for one of its objects to provide an improved thread milling machine of this type.

It is an object of the invention to provide an improved thread milling machine of the type stated, including a more compact arrangement for directly driving either the work spindle or cutter carriage in the manner above defined.

It is an object of the invention to provide a driving arrangement of the type last stated including a single shaft with means for driving the same in either direction at either carriage feeding or traversing speed and means for operatively connecting the shaft to directly drive either the work spindle or carriage lead screw, the spindle or screw not directly driven being indirectly driven through the before-mentioned change gears by the element directly driven.

It is an object of the invention to provide in a mechanism of the type last stated, means including a feed clutch for feeding the carriage in either direction, means including a double clutch for traversing the carriage in either direction, an interlock preventing the simultaneous engagement of such clutches, and means for automatically stopping the feeding or transversing movement of the carriage in different desired positions of its travel in either direction.

A further object of the invention is to provide means including a pair of studs driven in opposite directions and at the same speed for feeding the carriage in one direction or the other.

Another object of the invention is to provide improved means for driving the cutter spindle, such means including change gears on the cutter carriage and means for driving the same in either direction from a drive shaft extending longitudinally of the machine.

With these and other objects in view, my invention consists in the features of construction and operation set forth in the following specification and illustrated in the accompanying drawings. In such drawings annexed hereto and forming a part of this specification, I have shown my invention as embodied in a thread milling machine, but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of a thread milling machine comprising my invention.

Fig. 2 is a rear elevation thereof.

Fig. 3 is an end elevation of the headstock end of the machine.

Fig. 4 is an end elevation, partially in section on line 4—4 of Fig. 2, of the tailstock end of the machine.

Fig. 9 is a vertical sectional view through the headstock on line 9—9 of Figs. 2 and 5.

Fig. 10 is a diagrammatic view of the gearing and driving mechanism comprising the invention.

Fig. 11 is a diagrammatic view illustrating the cutting of a right hand thread.

Fig. 12 is a similar view illustrating the cutting of a left hand thread.

Figure 5:
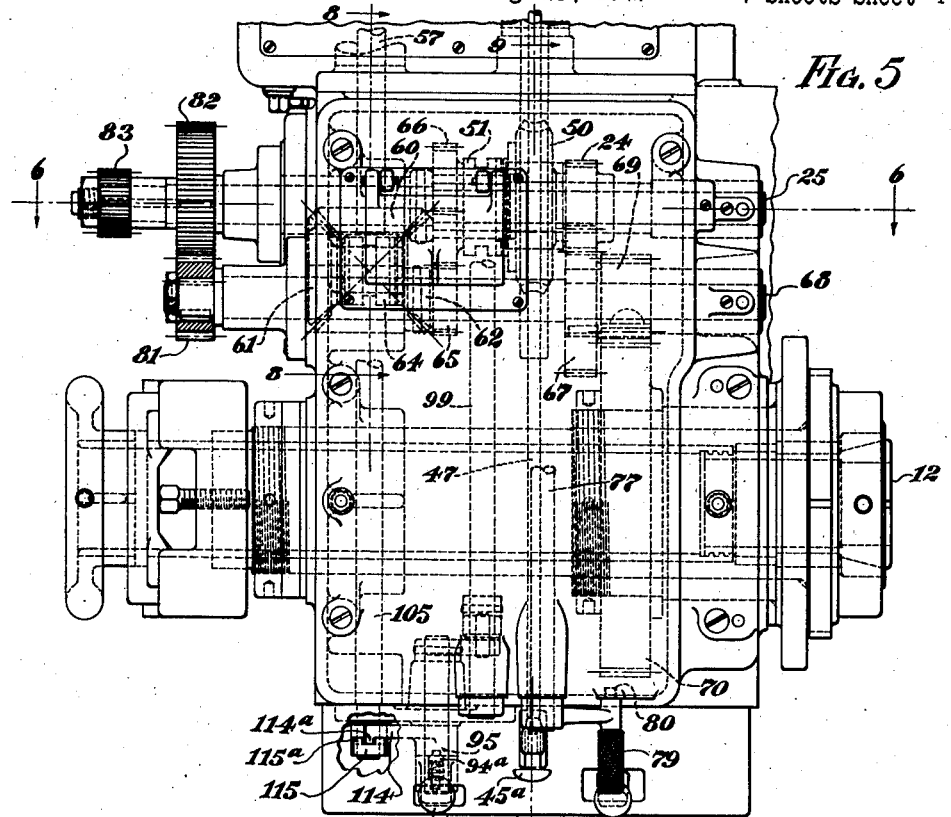
Fig. 5 is an enlarged fragmentary plan view of the headstock.
Figure 6:
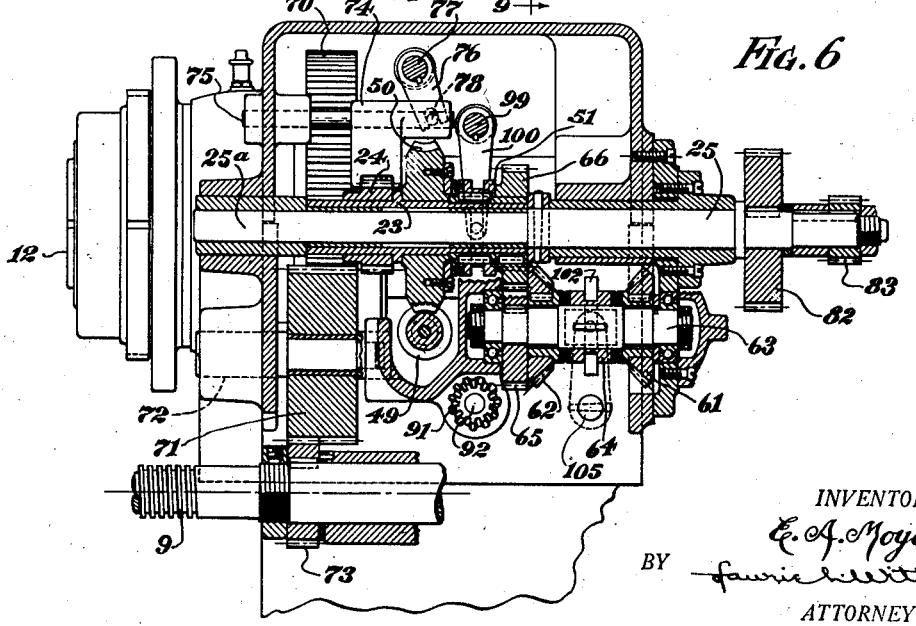
Fig. 6 is a fragmentary vertical sectional view on line 6—6 of Figs. 3 and 5.
Figure 7:
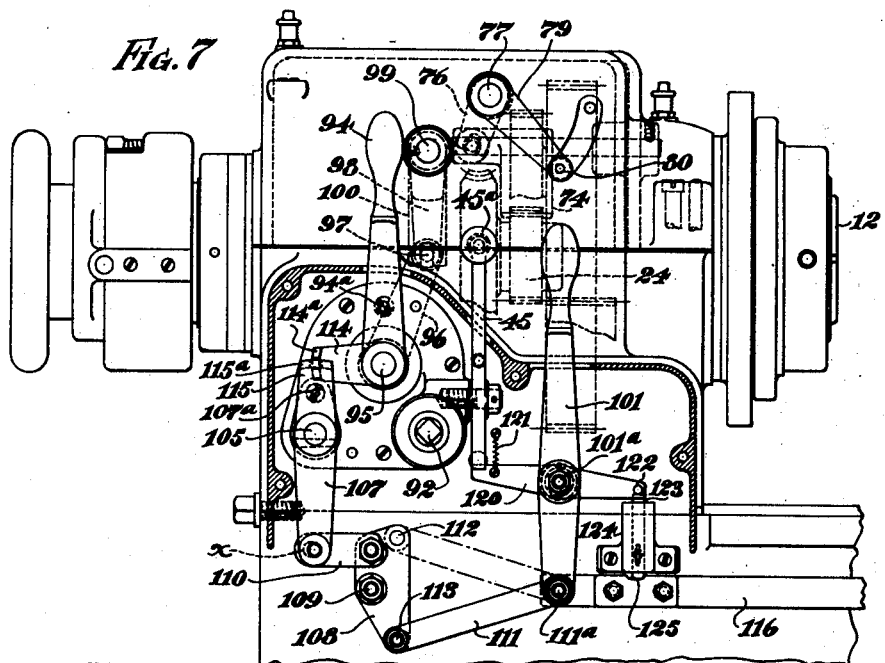
Fig. 7 is an enlarged fragmentary front elevation of the headstock.
Figure 8:
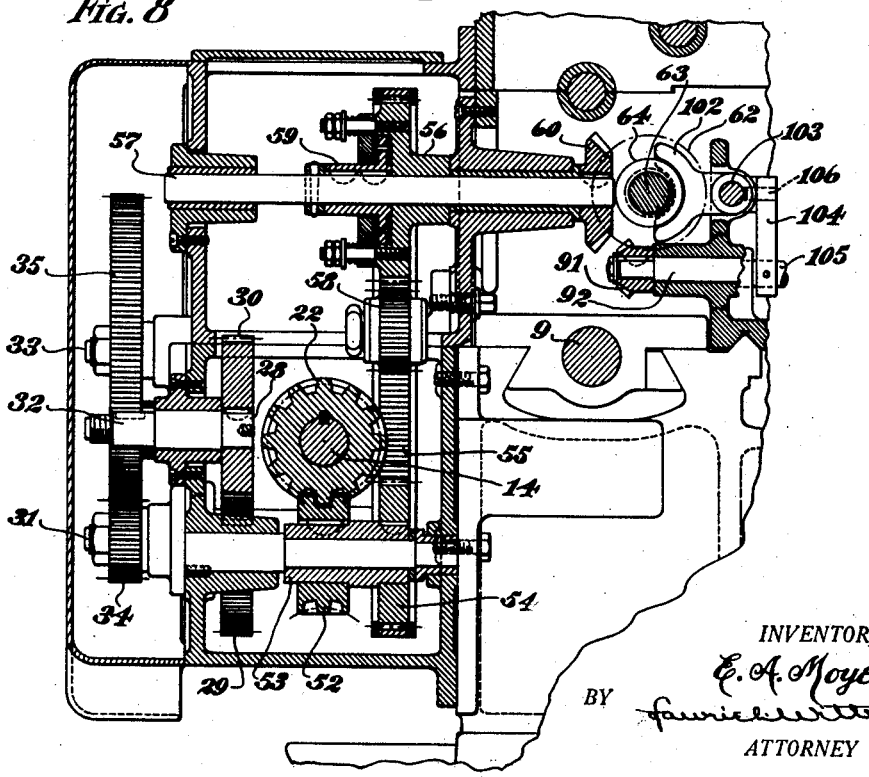
Fig. 8 is a fragmentary vertical sectional view through the headstock on line 8—8 of Figs. 2 and 5.

Referring to the figures of the drawings by reference characters, 1 indicates the frame or bed of the machine, on opposite ends of which are respectively supported a headstock 2 and a tailstock 3, the latter carrying the usual work supporting center 4 operated by a hand wheel 5 and clamped by a handle 6. A tool carriage 7 is slidably supported on ways 8 between the headstock and the tailstock, a lead screw 9 being operatively connected to a carriage nut 9ª to move the carriage along its ways. A tool slide 10 adjustable crosswise of the machine by means of a screw 11 is mounted on the carriage 7 and rotatably supports a tool spindle as hereinafter described.

A work spindle 12 is rotatably mounted in the headstock 2. The several parts of the machine, including the work spindle, the tool carriage, the tool spindle and an oil pump 13 are driven from a main power shaft 14. This shaft extends longitudinally of the machine at the rear thereof and is driven by a belt 15 on a pulley 16. The pulley may be operatively connected to or disconnected from the shaft by means of a friction clutch controlled by hand lever 17 on a shaft 18 and operative through a link 19 connecting an arm 18ª on the rear end of shaft 18 to a lever 20 pivoted at 20ª and connected to the clutch.

A worm 21 and a spiral gear 22 are provided on the shaft 14 within the headstock. These two elements, with intermediate driving connections hereinafter described, are adapted to rotate the work spindle 12 and the carriage lead screw 9, the worm being adapted to provide a relatively slow feeding movement and the spiral gear being adapted to provide a relatively fast traversing movement. Either of such elements, with its intermediate connecting means, is adapted to directly drive either the work spindle or the lead screw, both such drives being through a single tubular shaft 23 and a sliding gear 24 thereon in a manner hereinafter described. The tubular shaft 23 is rotatably supported on a reduced portion 25ª of a shaft 25.

The feed drive from the worm 21 to the shaft 23 is as follows:

The worm 21 is in mesh with a worm gear 26 keyed to a shaft 27. Parallel with this shaft 27 is a shaft 28. Two like gears 29 and 30 keyed respectively to these shafts are in meshing engagement whereby such shafts rotate at the same speed but in opposite directions. The ends of these two shafts project outwardly of the machine in a manner to provide two studs 31 and 32 adapted to receive gears thereon. A third parallel shaft 33 is mounted above and equally spaced from shafts 27 and 28. This shaft 33 is adapted to be driven from either shaft 27 or 28 through change or transposing gears 34 and 35. It will be understood that transposing gears of the proper ratio are used to give the required feeding speed and that the shaft 33 is rotated in one direction or the other, depending upon which stud 31 or 32 the same is driven from.

Keyed to the inner end of shaft 33 is a gear 36 in mesh with a gear 37 on a sleeve 38 loose upon a tubular shaft 39. Slidable over a key on the tubular shaft 39 is a clutch element 40 adapted to be engaged with a clutch element 41 secured to the inner face of gear 37. A rod 42 within the shaft 39 is pinned to the clutch element 40 at 43. A compression spring 44 operative against the end of rod 42 normally holds the clutch in a disengaged position. The clutch may be forced into the engaged position by means of a lever 45 pivoted at 46 and connected to a rod 47 extending into the tubular shaft 39 coaxial with the rod 42, an anti-friction ball 48 being interposed between the rods 42 and 47. The lever 45 constitutes a part of a mechanism hereinafter described for automatically stopping the feed by disengaging the clutch 40. Keyed to the tubular shaft 39 is a worm 49 meshing with a worm wheel 50 loose on the tubular shaft 23. A clutch 51 is splined to the shaft 23 for operatively connecting the worm wheel thereto.

The rapid traverse drive from the spiral gear 22 to the shaft 23 is as follows:

The spiral gear 22 is in mesh with a spiral gear 52 keyed to a sleeve 53. A sprocket gear 54 keyed to the inner end of the sleeve 53 is adapted by means of a link belt 55 to drive a sprocket gear 56 on a shaft 57, an idler belt tightening sprocket 58 being provided between sprocket gears 54 and 56. The sprocket gear 56 is loosely mounted on its shaft 57 and is frictionally connected to a sleeve 59 keyed to such shaft. Such arrangement permits the gear 56 to slip in case of an overload thereon, thereby providing a shock absorber and preventing breakage of the machine. A bevel gear 60 connected to the inner end of shaft 57 is in mesh with two bevel gears 61 and 62 loosely mounted on a short shaft 63. Either bevel gear 61 or 62 may be connected to the shaft to rotate the same in one direction or the other by means of a clutch element 64 splined to the shaft between such gears. A spur gear 65 on the inner end of shaft 63 is in mesh with a spur gear 66 keyed to the tubular shaft 23.

As thus far described, it will be seen that the shaft 23 may either be driven from the worm 21 in either direction at any desired relatively slow feeding speed or from the spiral gear 22 in either direction at a fast traversing speed. It is obvious that when driving the shaft 23 from the worm wheel 50, the clutch 51 is engaged therewith and the clutch 64 must be in a neutral position. Conversely, when driving the shaft 23 from the bevel gear 60, the clutch 64 is engaged with either bevel gear 61 or 62 and the clutch 51 must be in a neutral position. An interlocking mechanism hereinafter described is provided for preventing the simultaneous engagement of these clutches.

As heretofore stated, either the work spindle 12 or the carriage lead screw 9 is adapted to be directly driven from the shaft 23 through the gear 24 splined for sliding movement thereon. In Fig. 10, this gear 24 is illustrated as being in mesh with a gear 67 on a shaft 68 parallel with the spindle. A gear 69 on the shaft 68 and adjacent the gear 67 is in mesh with a gear 70 on the spindle. A direct drive is therefore established from the shaft 23 to the spindle. To directly drive the lead screw 9 from the shaft 23, the gear 24 is shifted out of mesh with the gear 67 and into mesh with a gear 71 loosely mounted on a shaft 72. This gear 71 is in mesh with a gear 73 secured to the screw. A direct drive is therefore established from shaft 23 to the lead screw.

The gear 24 is shifted by means of a fork 74 straddling the gear and slidably supported on a rod 75. An arm 76 depending from a rock shaft 77 engages a pin 78 in the fork 74. A handle 79 on the end of shaft 77 exteriorly of the headstock provides a means for rocking the shaft and shifting the gear into either of its operative positions. The free end of the handle is provided with a detent 80 for engagement in a hole at either end of its movement whereby to lock the gear in one or the other of its operative positions.

As before stated, the spindle or screw not directly driven from the gear 24 is adapted to be indirectly driven through change gears by the element being directly driven. As illustrated in the drawings (Fig. 10), these change gears comprise a gear 81 on the spindle driving shaft 68 in mesh with a gear 82 on the shaft 25, a gear 83 on shaft 25 in mesh with an idler gear 84 supported on a stud 85 in the bracket 86, and a second idler 87 secured to idler gear 84 and in mesh with a gear 88 on the lead screw. It will be noted that with the change gearing arrangement illustrated, the lead screw will be driven at a reduced speed from the spindle driving shaft 68. It should furthermore be understood that this arrangement may be varied in any manner to secure the desired speed and direction of rotation. For instance, when driving the lead screw directly from the gear 24, the change speed gearing arrangement should be such as to effect a reduction of speed from the screw (the driving element) to the spindle (the driven element). Also, an additional idler gear may be inserted whenever it is desired to rotate the lead screw or spindle in the opposite direction for forming left hand threads.

Means for rotating the shaft 23 by hand to manually adjust the spindle or carriage is provided as follows: A pinion 89 is in mesh with gear 65 and has connected thereto a bevel gear 90. A second bevel gear 91 on a shaft 92 is in mesh with bevel gear 90. The shaft 92 extends to the front of the machine where it is provided with a handle 93 for rotating such shaft and the shaft 23. It will be understood that both clutches 51 and 64 are placed in a neutral position when using this hand adjustment.

The clutch 51 is shifted by a lever 94 on a shaft 95 and the following connecting elements. An arm 96 on the shaft 95 has a pin and slot connection 97 to an arm 98 on a shaft 99. A yoke 100 engaging the clutch 51 is mounted on the opposite end of this shaft 99. It will be seen that movement of lever 94 in one direction or the other will respectively shift clutch 51 into an operative or an inoperative position.

The clutch 64 may be shifted by a handle 101 and the following connecting elements. A yoke 102 engaging the clutch 64 is slidable on a rod 103. An arm 104 mounted on the inner end of a shaft 105 has a pin and slot connection 106 to the yoke. A lever 107 is secured to the outer end of this shaft. A plate 108 pivoted at 109 is connected by a link 110 to the lower end of lever 107. The lower end of the handle 101 is connected by means of a link 111 to the plate 108 either at 112 or 113 respectively above or below the pivot 109. It will be seen that movement of the handle 101 about its pivot 101$^a$ will rock the plate 108 and the shaft 105 and thereby shift the clutch 64 in one direction or the other.

An interlock for preventing the simultaneous engagement of clutches 51 and 64 is provided as follows: The shaft 95 for operating clutch 51 and the shaft 105 for operating clutch 64 are respectively provided thereon with arms 114 and 115. Laterally projecting lugs 114$^a$ and 115$^a$ on the ends of these arms are slotted at the centers thereof whereby to permit movement of either lug through the slot of the other lug. However, such movement can only take place when the slot is in its neutral position, which position corresponds to the neutral position of the respective clutch. It will therefore be seen that either clutch may be shifted into an operative position only while the other clutch is in its neutral and inoperative position. The handle 94 and the lever 107 are respectively provided with detents 94$^a$ and 107$^a$ for normally holding the clutches 51 and 64 respectively in neutral position.

Means is provided in connection with feed clutch 40 and traversing clutch 64 for automatically throwing either of such clutches into a neutral position and thereby stopping the rotation of shaft 23 and consequently the rotation of the spindle and lead screw. This automatic trip mechanism is preferably controlled in such manner as to automatically stop the feeding or traversing movement of the carriage in different desired positions of its travel in either direction. In the drawings I have illustrated this mechanism as controlled by a stop rod having adjustable dogs thereon adapted to be engaged by the carriage to shift the rod longitudinally. This stop rod 116 is slidably mounted on the frame 1 of the machine and extends along the path of movement of the carriage 7. A pair of dogs 117 and 118 adjustable on the rod at opposite sides of the carriage are adapted to be engaged by a projecting portion 119 of the carriage. The headstock end of the rod is connected to the link 111 and handle 101 at 111$^a$ whereby shifting movement of the rod operates to automatically shift the clutch 64 to stop the traversing of the carriage as hereinafter described.

One end of a latch lever 120 pivoted at 101$^a$ is adapted to engage the lower end of lever 45 for holding the clutch 40 in an engaged position against the action of spring 43, a spring 121 being provided to normally hold lever 120 in its latching position. A pin 122 in the other end of the lever 120 is engaged by the upper end of a plunger 123 slidably mounted in a bracket guide 124. The lower end of plunger 123 rests in a notch 125 in a plate secured to the rod 116. It will be seen that shifting movement of the rod in either direction will raise the plunger upwardly out of the notch 125, thereby releasing latch lever 120 from its engagement with lever 45 and permitting spring 43 to disengage the feed clutch 40. The operation of this mechanism is hereinafter more fully described.

As heretofore stated, the main power shaft 14 is also adapted to drive the cutter spindle. The novel arrangement for performing this function, including the mounting of change gears on the cutter carriage, will now be described. A pair of bevel gears 126 and 127 splined to the shaft 14 are mounted in a box or bearing 128 slidable in carriage 7. A third bevel gear 129 on a shaft 130 mounted in the carriage is adapted to be engaged by either bevel gears 126 or 127 to drive the shaft 130 in one direction or the other. A pair of tap bolts 131 project through slots 132 in the carriage and are threaded into the box 128. The box is adapted to be shifted longitudinally to engage either bevel gear 126 or 127 with bevel gear 129, by means of a handle 133 pivoted at 134 and connected to an arm 135 engaging one of the tap bolts. The box is secured in its adjusted positions by tightening the tap bolts.

Mounted on the outer end of shaft 130 is a gear 136 in mesh with a gear 137 on a shaft 138. These two gears 136 and 137 are interchangeable for varying the speed of shaft 138 and other gears of different sizes may be substituted therefor when further speeds are required. A removable cover 139 secured to the gear box by clips 139$^a$ provides easy access to these gears. A gear 137$^a$ on shaft 138 meshes with a gear 140 keyed to a sleeve 141. A shaft 142 splined for longitudinal movement within the sleeve is carried by the cross slide 10. A bevel pinion 143 on the shaft 142 meshes with a bevel gear 144 on a shaft 145 parallel with the cutter spindle 146. The cutter spindle and the milling cutter 147 thereon are driven from the shaft 145 through a train of gears 148. The mechanism as described provides means on the cutter carriage for rotating the cutter spindle in either direction at the required speed from the main constant speed shaft 14.

It should be noted that shaft 145 and cutter spindle 146 with their intermediate driving mechanism are mounted on a bracket 149 and that this bracket is adjustable about the axis of shaft 142. Such adjustment may be accomplished by rotating a hand wheel 150 carried by the cross slide and provided with a worm in mesh with a worm wheel 151 secured to the bracket. It should furthermore be noted that the axial line of shaft 142 extends through the transverse plane and the horizontal axis of cutter 147.

In the drawings the several parts of the machine are illustrated as being adjusted and set up in a manner to cut a relatively fine right hand thread on a piece of work W (Fig. 11). The gear 24 is engaged with gear 67 whereby to drive the spindle 12 directly and the lead screw 9 indirectly and at a relatively reduced speed through the change gears 81—86. The slip gear 34 of the feed driving mechanism is illustrated as mounted on the stud 31 whereby the shaft 23 will be driven therefrom in a direction to rotate the work spindle in the direction indicated by the arrows a on the work piece W in Fig. 11. The change gearing 81—86 is so arranged as to rotate the lead screw from shaft 68 in a direction to feed the tool carriage toward the headstock, as indicated by the arrow b in Fig. 11. The bevel gear 127 is engaged with bevel gear 129 and change gears 136 and 137 of the proper ratio are provided to rotate the milling cutter 147 at the proper speed and in the direction indicated by the arrows c in Fig. 11. The link 111 is connected to the plate 108 at 113 below the pivot 109 and the dogs 117 and 118 are respectively adjusted on the rod 116 to positions corresponding to the starting and finishing positions of the carriage in the cutting operation.

The machine being set as just described and the carriage 7 being at its starting position adjacent the tailstock, the operator engages the main driving clutch in the pulley 16 by shifting the lever 17 and then feeds the milling cutter 147 to depth into the work by rotating the hand wheel 11a. The operator thereafter pushes the knob 45a of the lever 45 inwardly to engage the clutch 40 until the lever 120 latches against the same to hold the clutch engaged. Lever 94 in then moved to the right to engage clutch 51 with the worm gear 50. The work spindle and lead screw are thereupon slowly rotated at feeding speed to synchronously rotate the work spindle and feed the carriage in the directions indicated by the arrows a and b in Fig. 11, the milling cutter rotating in the direction indicated by the arrows c. This cutting operation continues to form the right hand thread in the work piece W until the projecting portion 119 of the carriage engages dog 118 and shifts the rod 116 to the left sufficiently to raise the plunger 123. This movement releases the latch lever 120 from lever 45 and permits the spring 44 to disengage the clutch 40 thereby stopping the feeding movement of the work spindle and carriage. It should be noted that the connecting bolt hole in one end of the link 110 is slotted at x to permit the rod 116 the slight movement just described to disengage the feed clutch without affecting the rapid traverse clutch 64.

The cutting operation having been completed, the operator rotates hand wheel 11a to withdraw the cutter from the work and thereafter disengages clutch 51 and shifts lever 101 to the right to engage clutch 64 with bevel gear 61 whereby to rapidly traverse the carriage back to its starting position adjacent the tailstock. As clutch 64 is engaged, the frictionally mounted sprocket gear 56 slips sufficiently to prevent any injurious shock in the driving connection. This traversing of the carriage continues until the portion 119 of the carriage engages dog 117 and shifts rod 116 to the right thereby drawing clutch 64 from the gear 61 into its neutral position and stopping the rotation of the spindle and lead screw with the carriage in its starting position.

While the thread cutting operation just described and illustrated in Fig. 11 comprises a feeding movement of the carriage toward the headstock and a traversing movement thereof in the opposite direction, it should be understood that these respective movements may be reversed if desired. It will be noted that engagement of the carriage with either dog 117 or 118 is adapted to automatically disengage the feed clutch 40. When traversing the carriage to the right (Fig. 1), as just described, the clutch 64 is engaged with bevel gear 61 and engagement of the carriage with the dog 117 shifts rod 116 and the clutch 64 to the right to stop the traversing movement. Conversely, when traversing the carriage to the left the clutch 64 is engaged with bevel gear 62 and engagement of the carriage with dog 118 shifts rod 116 and clutch 64 to the left to stop the traversing movement.

When it is desired to cut relatively fine left hand threads in the work piece, as illustrated in Fig. 12, the following changes must be made in the machine. The slip gear 34 should be transferred from stud 31 to stud 32 whereby the feed drive to the shafts 23 and 68 and to the spindle 12 will be in the opposite direction from that above described in connection with the cutting of a right hand thread. The spindle will therefore be rotated in the direction of arrows a in Fig. 12. The carriage 7 is to be fed in the same direction as before and therefore an idler gear must be inserted in the change gears 81—86 to retain the original direction of rotation of the lead screw, it being understood that the spindle 12 and its driving shaft 68 are rotated in the opposite direction from that heretofore described.

The traversing bevel gears 61 and 62 always rotate in their same respective directions and, since an idler gear has been placed in the change gear train 81—86, the clutch 64 must be shifted in the opposite direction (into engagement with gear 62) from that before described for traversing the carriage back to its starting position. For this reason the link 111 is connected to the hole 112 above the pivot 109 in the plate 108. As thus connected, the engagement of the carriage with the dog 117 and the shifting of the rod 116 to the right will move clutch 64 from engagement with gear 62 to its neutral position and stop the traversing movement. The bevel gear 126 must also be engaged with bevel gear 129 to rotate the milling cutter in the direction indicated by the arrows c in Fig. 12.

Power now being applied to the machine in the same manner as before described, the cutter is moved along the rotating work in a manner to cut the left hand thread illustrated in Fig. 12. The automatic disengagement of the feed clutch 40 by the engagement of the carriage with dog 118 is the same as before described. The operator thereafter causes the carriage to traverse back to its original position by moving lever 101 to the right (link 111 being connected to the hole 112 in plate 108) to engage clutch 64 with bevel gear 62. Engagement of the carriage with the dog 117 thereafter shifts rod 116 to the right and clutch 64 to the left to stop the traversing movement, the carriage being left in its original starting position.

It will be understood, as heretofore described, that when a relatively coarse thread is to be cut, wherein the lead screw must rotate faster than the work spindle, the sliding gear 24 is engaged with gear 71 whereby to rotate the lead screw directly and the work spindle indirectly therefrom through the change gears. The operations performed in cutting a coarse thread of either a right or left hand pitch in this manner are substantially the same as those above described in cutting a relatively fine thread. Further description of such operations is therefore believed to be unnecessary.

What I claim is:

1. In a thread milling machine, the combination of a work spindle, a cutter carriage, a screw operatively connected to the carriage, means including a shaft and a clutch for directly driving the screw or indirectly driving the same through the spindle driving means whereby to feed the carriage, means including the said shaft and a double clutch for directly driving the screw or indirectly driving the same through the spindle driving means whereby to rapidly traverse the carriage in either direction, and an interlock between the said two clutches for preventing their simultaneous engagement.

2. In a thread milling machine, the combination of a work spindle, a cutter carriage, a screw operatively connected to the carriage, means including a shaft and a clutch thereon for driving the screw to feed the carriage, means including the said shaft and a double clutch for driving the screw to rapidly traverse the carriage in either direction, and an interlock between the two said clutches for preventing their simultaneous engagement.

3. In a thread milling machine, the combination of a work spindle, a cutter carriage, a screw operatively connected to the carriage, means including a shaft and a clutch thereon for directly driving the screw or indirectly driving the same through the spindle driving means whereby to feed the carriage, means including the said shaft and a double clutch for directly driving the screw or indirectly driving the same through the spindle driving means whereby to rapidly traverse the carriage in either direction, and an interlock between the said two clutches for preventing their simultaneous engagement.

4. In a thread milling machine, the combination of a work spindle, a cutter carriage, a power element for rotating the spindle and moving the carriage, a screw operatively connected to the carriage, means including a shaft and a clutch driven from the power element for directly driving the screw or indirectly driving the same through the spindle driving means whereby to feed the carriage, means including the said shaft and a double clutch driven from the power element for directly driving the screw or indirectly driving the same through the spindle driving means whereby to rapidly traverse the carriage in either direction, and an interlock between the said two clutches for preventing their simultaneous engagement.

5. In a thread milling machine, the combination of a work spindle, a cutter carriage, a power element for rotating the spindle and moving the carriage, a screw operatively connected to the carriage, means including a shaft and a clutch thereon for driving the screw from the power element to feed the carriage, means including the said shaft and a double clutch for driving the screw to rapidly traverse the carriage in either direction, and an interlock between the two said clutches for preventing their simultaneous engagement.

6. In a thread milling machine, the combination of a work spindle, a cutter carriage, a screw operatively connected to the carriage, change gears operatively connecting the spindle and screw, a shaft, means for operatively connecting the shaft with the screw to directly drive the screw or for operatively connecting the shaft with the spindle to directly drive the spindle, the spindle or screw being indirectly driven, through the change gears by the element being directly driven, means for driving the shaft relatively slow for feeding the carriage, and means for driving the shaft relatively fast in either direction for traversing the carriage in either direction.

7. In a thread milling machine, the combination of a work spindle, a cutter carriage, a power element for rotating the spindle and moving the carriage, a screw operatively connected to the carriage, change gears operatively connecting the spindle and screw, a shaft, means for operatively connecting the shaft with the screw to directly drive the screw or for operatively connecting the shaft with the spindle to directly drive the spindle, the spindle or screw being indirectly driven through the change gears by the element being directly driven, and means operated from the power element for driving the said shaft relatively slow for feeding the carriage or relatively fast in either direction for traversing the carriage in either direction.

8. In a thread milling machine, the combination of a work spindle, a cutter carriage, a screw operatively connected to the carriage, change gears operatively connecting the spindle and screw, a gear for driving the screw, a gear for driving the spindle, a shaft, a gear on the shaft slidable into mesh respectively with either the screw or spindle driving gears, and means for driving the shaft relatively slow for feeding the carriage or relatively fast in either direction for traversing the carriage in either direction.

9. In a thread milling machine, the combination of a work spindle, a cutter carriage, a screw operatively connected to the carriage, change gears operatively connecting the spindle and screw, a gear for driving the screw, a gear for driving the spindle, a shaft, a gear on the shaft slidable into mesh respectively with either the screw or spindle driving gears, means for driving the shaft relatively slow for feeding the carriage or relatively fast in either direction for traversing the carriage in either direction, and hand operated means for rotating the screw through the said shaft and slidable gear.

10. In a thread milling machine, the combination of a work spindle, a cutter carriage, a screw operatively connected to the carriage, change gears operatively connecting the spindle and screw, a gear for driving the screw, a gear for driving the spindle, a shaft, a gear on the shaft slidable into mesh respectively with either the screw or spindle driving gears, means including a clutch for driving the said shaft relatively slow for feeding the carriage, means including a double clutch for driving the shaft relatively fast in either direction for traversing the carriage in either direction, and an interlock between the two said clutches for preventing their simultaneous engagement.

11. In a machine of the class described, the combination of a work spindle, a cutter carriage, means for feeding the carriage in either direction, means for rapidly traversing the carriage in either direction, and means for automatically stopping the feeding and traversing movements of the carriage in different desired positions of travel in either direction.

12. In a machine of the class described, the combination of a work spindle, a cutter carriage, means including a clutch and gearing for feeding the carriage in either direction, means for rapidly traversing the carriage in either direction, and means including a stop rod operative on the said clutch for automatically stopping the feeding movement of the carriage in different desired positions of travel in either direction and operative on the traversing means to automatically stop the traversing movement of the carriage in either direction.

13. In a machine of the class described, the combination of a work spindle, a cutter carriage, means including a clutch and gearing for feeding the carriage in either direction, means including a double clutch for rapidly traversing the carriage in either direction, means operative on the feed clutch to automatically stop the feeding movement of the carriage in different desired positions of travel in either direction, and means operative on the double clutch to automatically stop the traversing movement of the carriage in either direction.

14. In a machine of the class described, the combination of a work spindle, a cutter carriage, means including a clutch and gearing for feeding the carriage in either direction, means including a double clutch for rapidly traversing the carriage in either direction, a stop rod, adjustable stops on the rod adapted to be engaged by the carriage, means including the rod for automatically operating on the said feed clutch to stop the feeding movement of the carriage in either direction, and means including the rod for automatically operating the double clutch to stop the traversing movement of the carriage in either direction.

15. In a machine of the class described, the combination of a work support, a cutter carriage, a carriage feed screw, means for rotating the screw to feed the carriage in either direction, means for rotating the screw to rapidly traverse the carriage in either direction, means operative on the carriage feeding means to automatically stop the feeding movement of the carriage in different desired positions of travel in either direction, and means operative on the carriage traversing means to automatically stop the traversing movement of the carriage in either direction.

16. In a machine of the class described, the combination of a work spindle, a cutter carriage, means including a clutch and gearing for feeding the carriage in either direction, means including a double clutch for rapidly traversing the carriage in either direction, an interlock between the two clutches for preventing their simultaneous engagement, and means for automatically stopping the feeding or traversing movement of the carriage in different desired positions of travel in either direction.

17. In a machine of the class described, the combination of a work spindle, a cutter carriage, means including a clutch and gearing for feeding the carriage in either direction, means including a double clutch for rapidly traversing the carriage in either direction, an interlock between the two clutches for preventing their simultaneous engagement, means for automatically stopping the feeding movement of the carriage in different desired positions of travel in either direction, and means operative on the double clutch for stopping the traversing movement of the carriage in different positions of travel in either direction.

18. In a machine of the class described, the combination of a work support, a cutter carriage, a carriage feed screw, means for rotating the screw to feed the carriage in either direction, means for rotating the screw to rapidly traverse the carriage in either direction, a stop rod, adjustable stops on the rod adapted to be engaged by the carriage, means operated by the rod for automatically stopping the feeding movement of the carriage in either direction, and other means operated by the rod for automatically stopping the traversing movement of the carriage in either direction.

19. In a machine of the class described, the combination of a work spindle, a cutter carriage, power means for driving one of such elements, and a driving connection including a pair of adjacent shafts driven in opposite directions from the power means for driving the said one element, either of the said shafts being usable in the said driving connection whereby to drive the element in one direction or the other.

20. In a machine of the class described, the combination of a work spindle, a cutter carriage, power means for driving one of such elements, a shaft driven from the power means, a parallel shaft, gearing connecting such shafts whereby both rotate at the same speed but in opposite directions, and means adapted to be driven from one or the other of such shafts for driving the said one element in one direction or the other.

21. In a machine of the class described, the combination of a carriage, power means for driving the carriage, a pair of adjacent studs driven in opposite directions from the power means, and gearing including a slip gear adapted to be placed on one or the other stud for driving the carriage in one direction or the other.

22. In a machine of the class described, the combination of a work spindle, a cutter carriage, power means for driving one of such elements, a pair of adjacent studs, a gear on one stud meshing with a gear on the other stud whereby both rotate at the same speed and in opposite directions, a driving connection from the power means to the studs, and means including a slip gear adapted to be placed on one or the other stud for driving the said one element in one direction or the other.

23. In a machine of the class described, the combination of a carriage, power means for driving the carriage, a pair of parallel studs, a shaft parallel with the studs and equally spaced therefrom, a gear on one stud meshing with a gear on the other stud whereby both rotate at the same speed and in opposite directions, a driving connection from the power means to the studs, and means including a gear on the shaft and a gear adapted to be placed on either stud and to mesh with the gear on the shaft for driving the shaft and carriage in one direction or the other.

24. In a thread milling machine, the combination of a base, a headstock thereon, a work spindle in the headstock, a tool carriage on the base, a tool spindle rotatably mounted on the carriage, a power shaft extending longitudinally of the base, means operatively connecting the shaft to the work spindle, and an operative connection including change gears supported by the carriage between the power shaft and tool spindle.

25. In a thread milling machine, the combination of a base, a headstock thereon, a work spindle in the headstock, a tool carriage on the base, a tool spindle rotatably mounted on the carriage, a power shaft extending longitudinally of the base, means operatively connecting the shaft to the work spindle, a pair of bevel gears on the power shaft, a bevel gear supported by the carriage and adapted to be driven in either direction by the said pair of bevel gears, and an operative connection including transposing gears supported by the carriage between the said bevel gear and the tool spindle.

26. In a thread milling machine, the combination of a base, a headstock thereon, a work spindle in the headstock, a tool carriage on the base, a tool spindle rotatably mounted on the carriage, a power shaft extending longitudinally of the base, means operatively connecting the shaft to the work spindle, a bearing on the carriage supporting a pair of bevel gears splined to the power shaft, a third bevel gear on the carriage, means for adjusting the bearing longitudinally of the power shaft to mesh either gear of the said pair of bevel gears with the third bevel gear, a gear box on the carriage, and an operative connection including change gears in the gear box between the third bevel gear and the tool spindle.

27. In a thread milling machine, the combination of a base, a headstock thereon, a work spindle in the headstock, a tool carriage on the base, a cross slide movable transversely on the carriage, a tool spindle rotatably mounted in the cross slide, a power shaft extending longitudinally of the base, power transmitting mechanism including change gears mounted on the rear of the carriage, power transmitting mechanism on the slide including a shaft operatively connected to the tool spindle and splined to the power transmitting mechanism on the carriage for longitudinal movement therein with the movement of the slide on the carriage, and means for driving the said power transmitting mechanisms and tool spindle from the said power shaft.

In testimony whereof, I hereto affix my signature.

EDWARD A. MOYER.